United States Patent Office

2,939,846
Patented June 7, 1960

---

2,939,846

PRODUCTION OF POLYMERIZATION CATALYST

Morris Gordon, Manchester, Bernard Wright, Eccles, Manchester, and Edward T. Borrows, Bowdon, England, assignors to Shell Oil Company, a corporation of Delaware No Drawing. Filed May 25, 1956, Ser. No. 587,193

Claims priority, application Great Britain May 27, 1955

6 Claims. (Cl. 252—431)

This invention relates to an improved process for manufacture of a special type of polymerization catalyst and includes polymerization of olefinic compounds to valuable polymers with the catalyst.

It was known heretofore that olefinic hydrocarbons, particularly ethylene, could be polymerized by bringing the olefin into contact with a complex catalyst dissolved or suspended in an inert liquid hydrocarbon solvent such as hexane, the catalyst having been prepared by mixing a reducing compound of aluminum, magnesium, zinc or alkali metal—e.g., triethyl aluminum, with a salt of a metal of groups IV to VI of the periodic table—e.g., titanium tetrachloride. The use of the liquid inert hydrocarbon solvent for preparing the catalyst and for effecting the polymerization is disadvantageous. It has now been found that the disadvantages may be obviated and overcome by the method of the present invention.

According to our invention, separate streams of inert gas are used to entrain vapor of the reducing compound and the metal salt, and the streams are then mixed. The formed catalyst is deposited on a surface, and may be used as deposited to effect polymerization, or removed and pulverized for use in a fluidized system. More precisely, our invention is a process of producing a polymerization catalyst by entraining in an inert gas stream vapor of a reducing compound of a metal of the class consisting of aluminum, magnesium, zinc and alkali metals, also entraining in a separate inert gas stream vapor of a salt of a metal of sub-groups $a$ of groups IV to VI of the periodic table as illustrated on page 28 of Ephraim, "Inorganic Chemistry," 6th English Edition, i.e., of the left-hand sub-groups of groups IV, V and VI, which salt has the metal in a higher state of valency than its lowest positive valency, intermixing or commingling the two gas streams containing vapor of the catalyst components, and depositing the resulting catalyst on a surface. The invention also includes subsequently contacting a polymerizable compound with the formed catalyst to polymerize the compound.

The catalyst-forming components used in the process are volatile liquids at the temperature of entrainment at which no appreciable decomposition occurs. Generally, the components have a boiling point corresponding to that which is below about 350° C. under 1 atmosphere pressure, particularly below about 200° C. Among typical reducing compounds are such organo-metallic compounds as trimethyl aluminum, triethyl aluminum, triisobutyl aluminum, dimethyl aluminum hydride, diethyl aluminum chloride, ethyl aluminum dichloride, diethyl aluminum bromide, ethyl aluminum sesquihalide (mixture of diethyl aluminum chloride and ethyl aluminum dichloride), diisobutyl aluminum chloride, diethyl aluminum ethoxide, dimethylamino dimethyl aluminum, dibutyl aluminum fluoride, diethyl magnesium, methyl magnesium chloride, ethyl magnesium chloride or bromide, butyl magnesium fluoride, diethyl zinc, dipropyl zinc, dibutyl zinc, lithium ethyl, lithium butyl, etc. Preferred compounds are those of aluminum having 1 to 3 alkyl groups of up to 4 carbon atoms linked directly to the metal. Many suitable aluminum compounds are described by Grosse and Mavity in J. Org. Chem. 5, 106–121 (1940). Among the metal salts are such typical compounds as titanium tetrachloride, titanium trichloride, titanium tetrafluoride, titanium tetrabromide, thorium acetylacetonate, thorium tetrabromide, uranium hexafluoride, vanadium tetrachloride, columbium pentafluoride, columbium pentachloride, tantalum pentafluoride, tantalum pentachloride, tantalum pentabromide, chromium acetylacetonate, molybdenum pentafluoride, molybdenum pentachloride, tungsten pentachloride, tungsten hexachloride, tungsten pentabromide, etc.

Preferably the entrainment is effected by passing the entraining gas through the liquid component maintained at a temperature which will give the desired degree of entrainment. The deposition of the catalyst is preferably effected by passing the mixed gas streams over a cooled surface on which the catalyst deposits.

The temperature of the components being entrained and of the entrained vapors must be kept at such a level that no appreciable decomposition occurs. Furthermore the catalyst depositing from the mixed gas streams should not be subjected to a temperature at which its activity is decreased. Generally speaking, the temperature of the catalyst should not be allowed to exceed 100° C. and preferably it should not be allowed to exceed 60° C. In the production of a catalyst in accordance with the invention, it may be found necessary to apply cooling to the mixed gas streams to ensure that the temperature thereof does not exceed 100° C., and preferably does not exceed 60° C.

The gas employed for entrainment is one which does not react to any noticeable extent with the individual components entrained or with the catalyst formed under the conditions of operation. Thus nitrogen, helium, methane, ethane, or the like may be used as the entraining agent.

Preferably, however, ethylene or other mono-olefinic hydrocarbon gas such as propylene, butylene, etc., is used for the entrainment. When a mono-olefinic hydrocarbon gas and especially ethylene, is used as the entraining agent, a particularly active catalyst is formed. The exact mechanism of the catalyst formation is not known but it is apparent that the presence of ethylene or other mono-olefinic hydrocarbon favorably influences the form in which the catalyst is deposited. The ethylene and other mono-olefinic hydrocarbon may be used in the form of hydrocarbon gas mixtures containing them.

It will be appreciated that in the production of catalysts in accordance with the invention the proportions of the components taking part in the formation of the catalyst may be varied by varying the speed of each entraining stream of gas, by varying the proportions in which the gas streams are mixed or by varying the temperature at which the entrainment of each component takes place. A combination of two or more of these methods may be used.

The invention also consists in the polymerization of a polymerizable olefinic compound, particularly an alkene-1 compound, using a solid or semi-solid catalyst produced by deposition from a gas stream as described above. The polymerization may simply be effected by passing an olefinic compound such as ethylene, propylene, butylene or ethylene-containing hydrocarbon gases over a surface on which the catalyst has been deposited or it may be effected by suspending the catalyst in a finely divided state in the ethylene gas stream. The temperatures and pressures employed may be similar to those employed in the Ziegler processes. For example, temperatures of up to 100° C. and preferably up to 70° C., and pressures up to 10 atmospheres may suitably be used. When the catalyst is deposited in a semi-solid form, it may be converted to a form more suitable for disintegration by a preliminary polymerization of ethylene in contact therewith.

The invention is illustrated by the following example:

*Example*

Two streams of dry ethylene were aspirated through two identical bubblers, the one containing titanium tetrachloride and the other diethyl aluminum chloride and both standing in an oil maintained at 60 to 70° C. The speed of the stream passing through the aluminum compound was 150 cc. per minute and that passing through the titanium compound 100 cc. per minute. The streams were joined at the head of a tube which was externally water-cooled and was slowly rotated. The mixed streams passing through the tube left a brown deposit on the inner surface thereof.

After 30 minutes the passage of the entraining streams through the tube was stopped and dry ethylene was passed through, the temperature being maintained at 60° C. An ethylene polymer was deposited as an off-white solid, which on separation from the catalyst and purification was found to have an intrinsic viscosity of 0.5.

The combined production of solid catalyst and of polyethylene in accordance with the invention is well adapted to be carried out in a continuous manner e.g. as follows:

Two streams of inert gas are passed through separate pipes into two bubblers each heated to the desired temperature and containing one of the catalyst-forming components. The gases leaving the bubblers pass through separate heated pipes into a heated condenser containing a water-cooled rotating roller. Solid catalyst which is condensed on the roller is scraped off by a doctor blade. The inert gas from which the catalyst has been deposited passes out of the condenser to a blower by which it is returned to the original source of circulating gas.

The catalyst removed by the doctor blade falls into a screw conveyor by which it is fed to a disintegrator from which the finely divided catalyst is passed to a second screw conveyor and thence into a reactor consisting of a number of pipes connected together by return bends and provided with a cooling jacket. Gas is circulated through the reactor by a blower at such a velocity as to maintain the catalyst particles in uniform suspension. Stagewise introduction of ethylene into the reactor at different points is arranged to maintain a uniform temperature in the reactor below 80° C. and preferably in the range 55 to 65° C. The ethylene itself may serve to maintain the catalyst particles in suspension.

A portion of the gas stream circulating through the reactor is continuously taken off and passed through a dust collector in which the polymer is recovered and from which it is passed to the purification plant.

Residual gas after removal of the polymer is recirculated to the reactor. A bleed is provided to remove accumulations of unreactive material and then the removed gas is passed through a filter system to collect residual polymer dust before it is passed to the atmosphere.

We claim as our invention:

1. A process for producing a polymerization catalyst which comprises entraining in an inert gas stream vapor of a reducing organometallic compound of a metal of the class consisting of aluminum, magnesium, zinc, and alkali metals; entraining in a separate inert gas stream vapor of a salt of a metal of sub-group $a$ of groups IV to VI of the periodic table, which salt has the metal in a higher state of valency than its lowest positive valency; intermixing the two gas streams at a temperature at which said catalyst components are vaporizable and not above about 100° C.; and depositing the resulting polymerization catalyst on a solid surface.

2. A process for the production of a polymerization catalyst which comprises entraining vapor of an aluminum compound having 1 to 3 alkyl radicals of up to 4 carbon atoms linked directly to the metal in a stream of ethylene gas; separately entraining vapor of a salt of titanium in another stream of ethylene gas, which salt has the titanium in a higher state of valency than +2; commingling the two gas streams at a temperature at which said catalyst components are vaporizable and not above about 100° C.; and depositing the resulting polymerization catalyst on a solid surface.

3. A process for the production of a polymerization catalyst which comprises passing a stream of ethylene through a body of liquid diethyl aluminum chloride at about 50 to 80° C. to entrain vapor of the aluminum compound in the gas stream; separately passing another stream of ethylene through a body of liquid titanium tetrachloride at about 50 to 80° C. to entrain vapor of the titanium compound in the gas stream; intermixing the two gas streams containing the entrained compounds at a temperature at which said catalyst components are vaporizable and not above about 80° C.; and depositing the resulting polymerization catalyst on a cooled solid surface.

4. A process for producing a polymerization catalyst which comprises entraining in a gas stream vapor of a reducing organometallic compound of a metal of the class consisting of aluminum, magnesium, zinc and alkali metals; entraining in a separate gas stream vapor of a salt of a metal of sub-group $a$ of groups IV to VI of the periodic table, which salt has the metal in a higher state of valency than its lowest positive valency; and intermixing the two gas streams at a temperature at which said catalyst components are vaporizable and not above about 100° C.

5. A process according to claim 4 in which said gas is ethylene, said organometallic compound is an aluminum compound having 1 to 3 alkyl radicals of up to 4 carbon atoms linked directly to the metal and said salt is a salt of titanium having a valency higher than +2.

6. A process according to claim 4 in which said gas is ethylene, said organometallic compound is diethyl aluminum chloride and said salt is titanium tetrachloride.

References Cited in the file of this patent

UNITED STATES PATENTS

| 1,473,543 | Clancy | Nov. 6, 1923 |
| 1,914,558 | Craver | June 20, 1933 |
| 2,691,647 | Fields et al. | Oct. 12, 1954 |
| 2,710,854 | Seelig | June 14, 1955 |
| 2,846,426 | Larson et al. | Aug. 5, 1958 |